United States Patent [19]

Karashima

[11] Patent Number: 4,620,637

[45] Date of Patent: Nov. 4, 1986

[54] TROLLEY

[76] Inventor: Masashi Karashima, 88-5, Nakano, Ebina-shi, Kanagawa-ken, Japan

[21] Appl. No.: 774,230

[22] Filed: Sep. 9, 1985

[51] Int. Cl.[4] .............................................. A47F 5/16
[52] U.S. Cl. .................................... 211/188; 211/126; 280/47.35
[58] Field of Search ............... 211/188, 194, 126, 133; 280/47.35, 79.3

[56] References Cited

U.S. PATENT DOCUMENTS 4,467,927  8/1984  Nathan ............................ 211/188 X

FOREIGN PATENT DOCUMENTS 1366947  6/1964  France ................................... 28/79.3
299952  11/1928  United Kingdom ............... 280/79.3
582674  11/1946  United Kingdom ............... 280/79.3

*Primary Examiner*—Robert W. Gibson, Jr.
*Attorney, Agent, or Firm*—Wenderoth, Lind & Ponack

[57] ABSTRACT

Four metal support pipes with casters mounted on the lower ends thereof are arranged at the four corners of a quadrilateral. Pipe cover portions provided at four corners of a plurality of synthetic resin rack boards are threaded over the corresponding support pipes. Synthetic resin spacer pipes are threaded over the support pipes between the pipe cover portions of vertically-adjacent rack boards. Tubular cushion materials which can freely expand and contract are threaded over the support pipes between the pipe cover portions of the uppermost rack board and the uppermost spacer pipes, and fastening members are fitted into the upper ends of the support pipes to fasten the uppermost rack board.

1 Claim, 12 Drawing Figures

TROLLEY

BACKGROUND OF THE INVENTION

1. Field of the Invention

This invention relates to a trolley for vegetables, fish, meat and so forth which is used at a supermarket, a restaurant or the like.

2. Description of the Prior Art

A trolley proposed by the inventor in Japanese Utility Model Publication No. 17945/1979 is composed of four support pipes (b) which are arranged at the four corners of a quadrilateral and which have casters (a) mounted on the lower ends thereof, a plurality of rack boards (c) having pipe cover portions (d) at four corners which are threaded over the support pipes (b), spacer pipes (e) threaded over the support pipes between the pipe cover portions (d) of vertically-adjacent rack boards (c), and caps (f) which are fitted over the upper ends of the support pipes (b). (See FIGS. 9 and 10.)

In the working area of a supermarket or a restaurant, such a trolley is frequently wheeled into and out of a refrigerator or a freezing store. In this case, there is a difference in temperature between the refrigerator or the cold store and the working area.

Therefore, in order to help prevent the operator of the trolley feeling cold and also to make the trolley lighter, the rack boards and the spacer pipes are formed of synthetic resin.

Since synthetic resin is weak, it is necessary to reinforce the rack boards and the spacer pipes by using a metal as the material of the support pipes.

However, since the coefficients of thermal expansion of metal and synthetic resin are strikingly different, differences arise in the degrees of expansion and contraction of the two materials when the trolley is wheeled into or out of the refrigerator or the cold store, so that a gap t is generated between each cap (f) and its pipe cover portion (d) of the uppermost rack board (c), making the trolley rickety. (FIG. 12)

SUMMARY OF THE INVENTION

Accordingly it is an object of the present invention to provide a trolley in which the above-described problem is solved. To this end, a trolley according to the present invention is composed of: four metal support pipes which are arranged at the four corners of a quadrilateral and have casters (a) mounted on the lower ends thereof; a plurality of rack boards of a synthetic resin which have pipe cover portions at four corners which are threaded over the metal support pipes; spacer pipes of a synthetic resin inserted between the pipe cover portions of vertically-adjacent rack boards; fastening members which are fitted into the upper ends of the support pipes to fasten the uppermost rack board; and tubular cushion materials which can freely expand and contract and which are inserted between the uppermost rack board and the uppermost spacer pipes.

By virtue of the above-described structure of the trolley according to the invention, when the trolley is in a working area where the temperature is high, the portions formed of synthetic resin expand to a greater degree than the metal support pipes, but the tubular cushion materials inserted between the uppermost rack board and the uppermost spacer pipes are pressed therebetween and contract, so that the differences in expansion between the portions formed of synthetic resin and the metal support pipes are absorbed.

When the trolley is in a refrigerator or a cold store, the synthetic resin portions contract to a greater degree than the metal support pipes, but extension of the tubular cushion materials absorbs the differences in contraction between the synthetic resin portions and the metal support pipes.

As described above, the trolley according to the invention, in which cushion materials which can freely expand and contract are placed over the metal support pipes between the pipe cover portions of the uppermost rack board made of synthetic resin and the uppermost spacer pipes made of synthetic resin, can absorb the differences in expansion which arise between the synthetic resin portions and the metal support pipes of the trolley, thereby preventing the trolley from becoming loose and rickety.

The above and other objects, features and advantages of the present invention will become clear from the following description of the preferred embodiment thereof, taken in conjunction with the accompanying drawings.

DESCRIPTION OF THE PREFERRED EMBODIMENT

Figure 1:
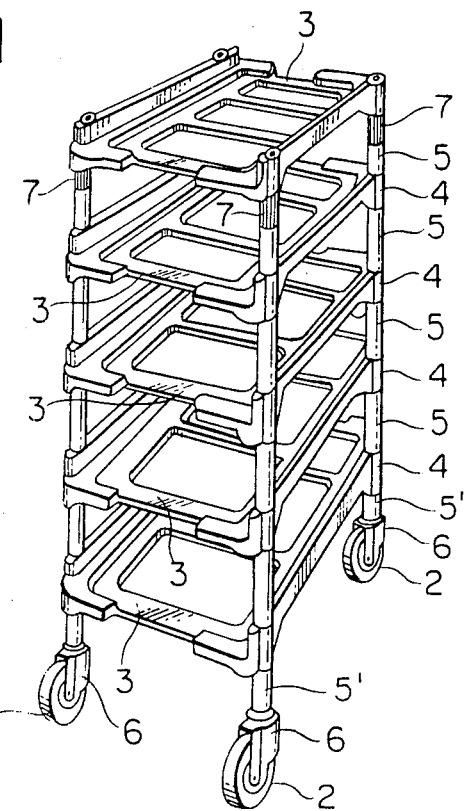
FIG. 1 is a perspective view of an embodiment of a trolley according to the present invention.
Figure 2:
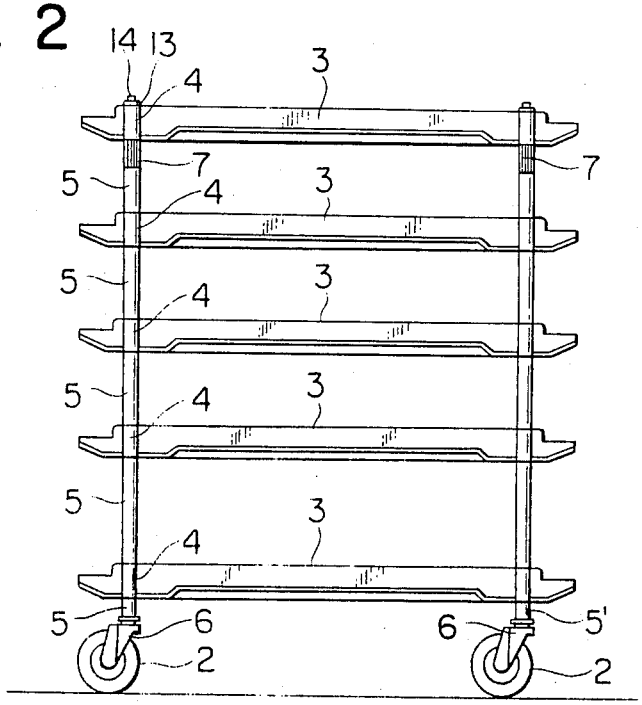
FIG. 2 is an elevational view of the embodiment shown in FIG. 1.
Figure 3:
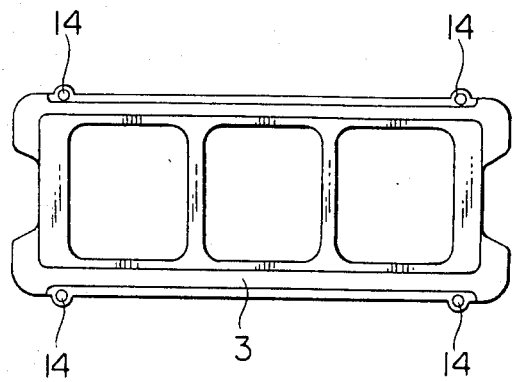
FIG. 3 is a plan view of the embodiment.
Figure 4:
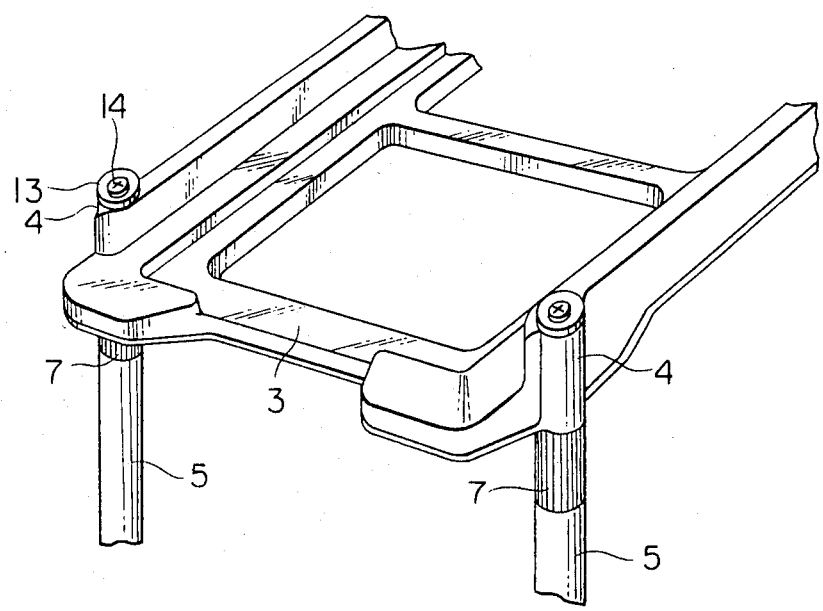
FIG. 4 is a perspective view of a part of the embodiment.
Figure 5:
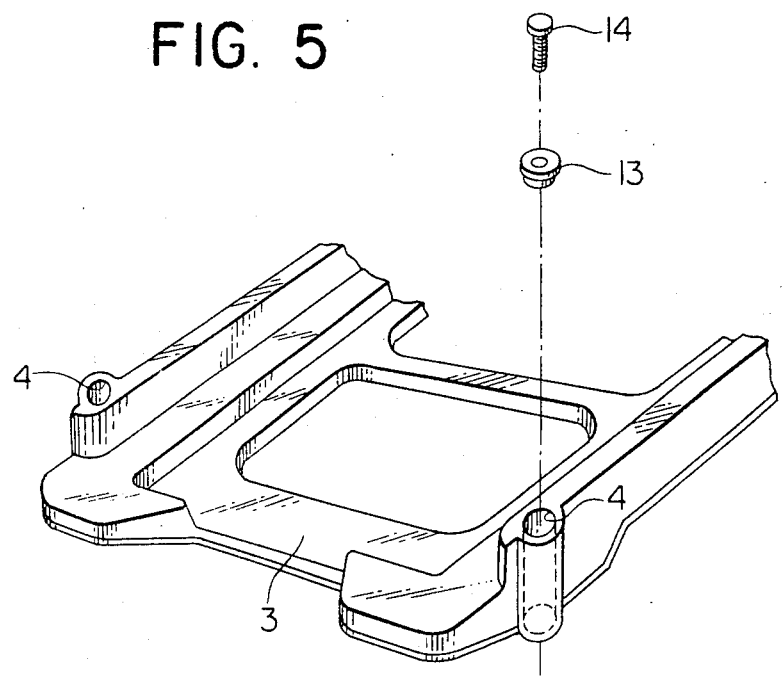
FIG. 5 is an exploded perspective view of the part shown in FIG. 4.

The present invention will be explained hereinunder with reference to the accompanying drawings.

The reference numeral (1) denotes four metal support pipes which are arranged at the four corners of a quadrilateral and have casters (2) mounted on the lower ends thereof. Pipe cover portions (4), which are arranged at four corners of each of a plurality of rack boards (3) formed of a synthetic resin are threaded over each of the support pipes (1). Synthetic resin spacer pipes (5) are threaded over the support pipes between the pipe cover portions (4) vertically-adjacent rack boards (3). The reference numeral (5') in the drawings denotes synthetic resin spacer pipes threaded over the support pipes (1) between the pipe cover portions (4) of the lowermost rack board (3) and attachment cases (6) of the casters (2) mounted on the lower ends of the support pipes (1).

Tubular cushion materials (7) which can freely expand and contract are threaded over the support pipes (1) between the pipe cover portions (4) of the uppermost rack board (3) and the uppermost spacer pipes (5).

The tubular cushion material (7) is formed of rubber, a soft synthetic resin, a coil spring wound in a tubular form, or the like.

A nut holder (8) is inserted into the upper end of each of the support pipes (1) in such a manner that upright retaining pieces (10) formed by cutting into the support pipe (1) are engaged with an annular groove (9) which is provided on the outer surface of the holder (8), thereby securing the nut holder (8) to the support pipe (1).

A square nut (12) is inserted into a rectangular hole (11) provided in the axial direction of the nut holder (8), and a fastening control bolt 14 which is loosely inserted into an elastic cap (13) formed of a synthetic resin, rubber, or the like mounted on the pipe cover portion (4) of the uppermost rack board (3), is screwed into the nut (12).

Figure 6:
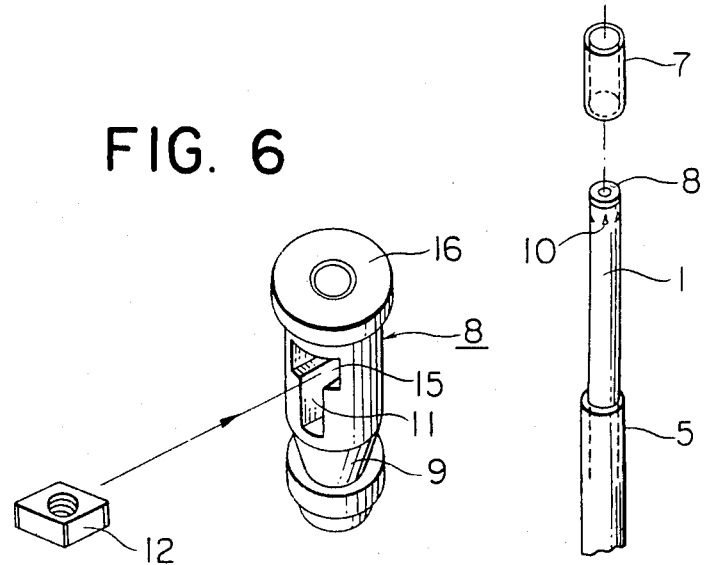
FIG. 6 is a perspective view of a nut holder.

FIG. 6 shows the nut holder (8) in detail. A horizontal square hole (15) communicating with the rectangular hole (11) is formed in the side surface of the holder, so that the square nut (12) can be inserted through the square hole (15) into the holder (8). A collar piece (16) which is retained by the upper edge of the support pipe (1) is provided at the upper end of the nut holder (8).

Figure 8:
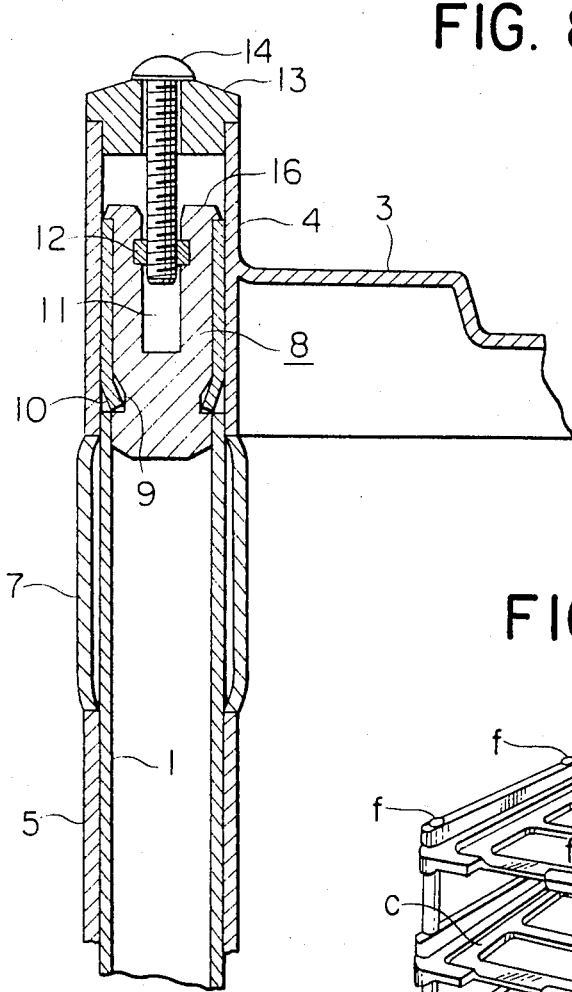
Figure 9:
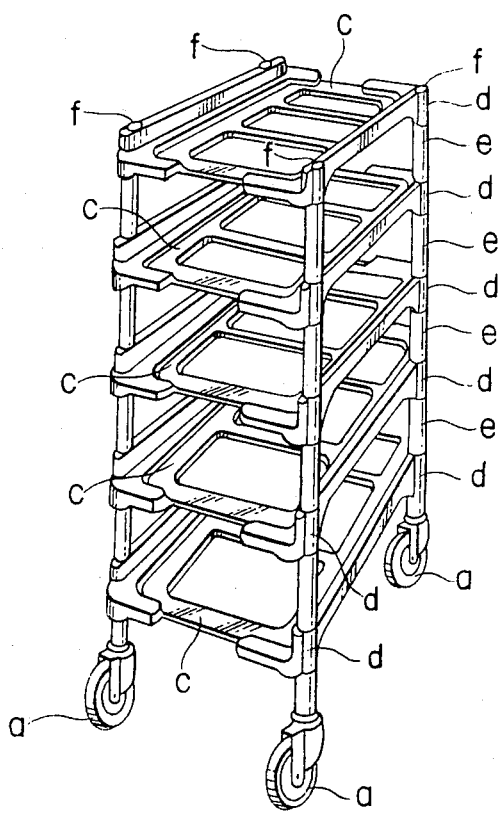
FIG. 9 is a perspective view of a conventional trolley.
Figure 10:
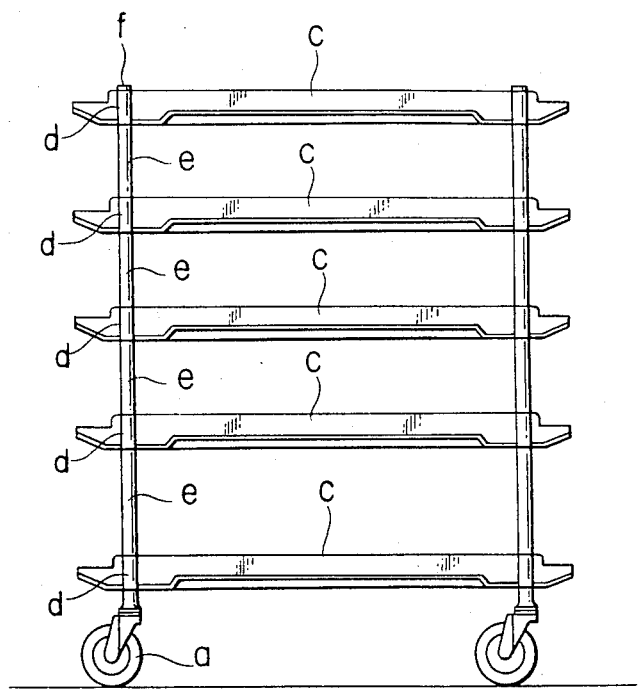
FIG. 10 is an elevational view of the trolley shown in FIG. 9.
Figure 11:
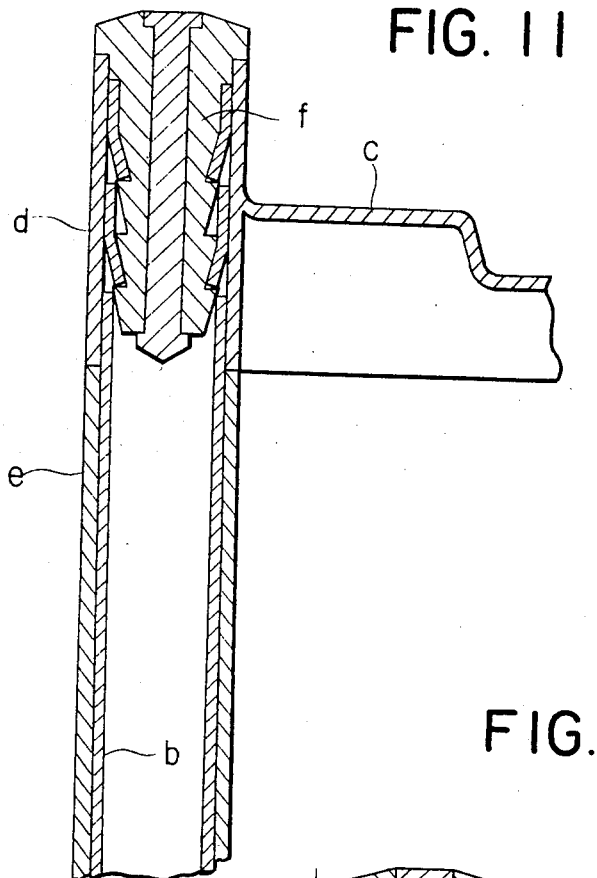
FIG. 11 is an enlarged vertical sectional view of a part of the conventional trolley shown in FIG. 9.
Figure 12:
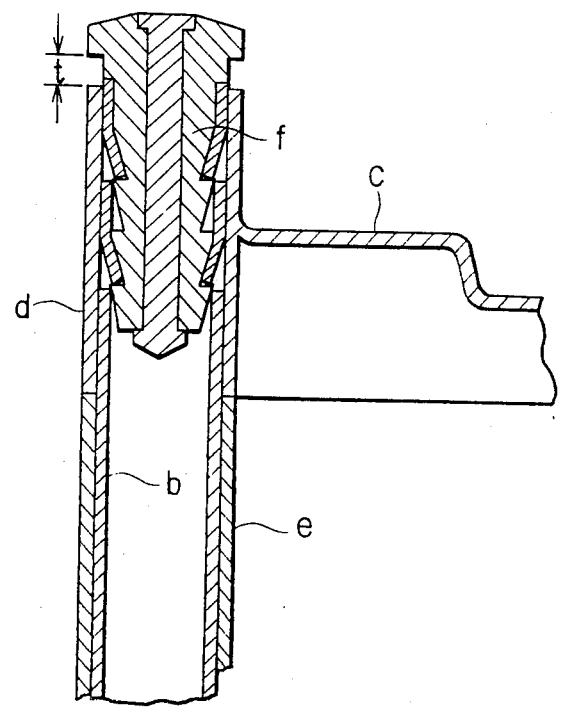
FIG. 12 is an enlarged vertical sectional view of the part shown in FIG. 11, illustrating it in its contracted state.

The embodiment shown in the drawings has the above-described structure. When the trolley is in a working area where the temperature is high, the synthetic resin spacer pipes (5) and the pipe cover portions (4) of the rack boards (3) expand more than the metal support pipes (1), so that the cushion materials (7) are compressed by the pipe cover portions (4) of the uppermost rack board (3) and the uppermost spacer pipes (5) and contract, as is shown in FIG. 8, to absorb the differences in expansion between the metal support pipes (1) and the synthetic resin spacer pipes (5) and rack boards (3).

Figure 7:
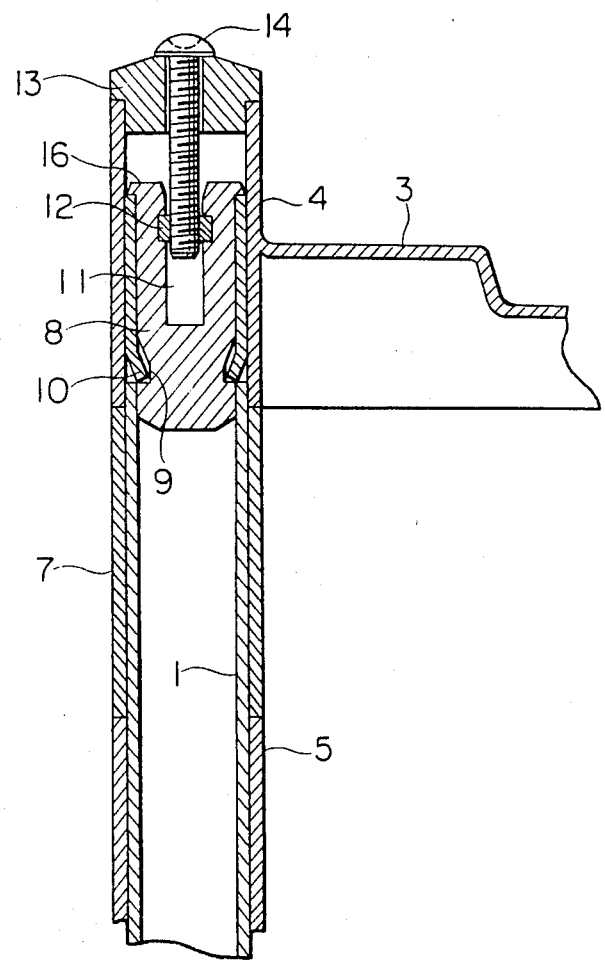
FIGS. 7 and 8 are enlarged vertical sectional view of a cushion material illustrating its expanded state and contracted state, respectively.

When the trolley is in a refrigerator or a cold store and the synthetic resin spacer pipes (5) and the synthetic resin rack boards (3) contract more than the metal support pipes (1), the compressive force of the cushion materials (7) which have been contracted is released or reduced, whereby the cushion materials (7) expand under this repulsive force, as is shown in FIG. 7, thereby absorbing the differences in contraction between the metal support pipes (5) and the rack boards (3).

If any looseness arises between the assembled members of the trolley during use, it can be removed by adjusting the fastening with the fastening control bolts (14).

As has been described above, according to this embodiment, the tubular cushion materials (7) are threaded over the metal support pipes (1) between the pipe cover portions (4) of the uppermost synthetic resin rack board (3) and the uppermost synthetic resin spacer pipes (5), and absorb the differences in expansion and contraction which arise between the synthetic resin portions and the metal support pipes of the trolley, thereby preventing the trolley becoming loose and rickety.

While there has been described what is at present considered to be a preferred embodiment of the invention, it will be understood that various modifications may be made thereto, and it is intended that the appended claims cover all such modifications as fall within the true spirit and scope of the invention.

What is claimed is:

1. A trolley comprising:
   four metal support pipes which are arranged at the four corners of a quadrilateral and which have casters mounted on the lower ends thereof;
   a plurality of rack boards of a synthetic resin provided with pipe cover portions at four corners thereof which are threaded over said metal support pipes;
   spacer pipes of a synthetic resin inserted between said pipe cover portions of vertically-adjacent rack boards;
   fastening members which are fitted into the upper ends of said support pipes for the purpose of fastening the uppermost of said rack boards; and
   tubular cushion materials which can freely expand and contract and which are inserted between said pipe cover portions of said uppermost rack board and the uppermost of said spacer pipes.

* * * * *